United States Patent
Noh et al.

(10) Patent No.: US 9,911,977 B2
(45) Date of Patent: Mar. 6, 2018

(54) CATHODE ACTIVE MATERIAL COMPRISING LITHIUM MANGANESE OXIDE CAPABLE OF PROVIDING EXCELLENT CHARGE-DISCHARGE CHARACTERISTICS AT 3V REGION AS WELL AS 4V REGION

(75) Inventors: Hyun Kuk Noh, Daejeon (KR); Sin Kyu Kim, Daejeon (KR); Geun-Chang Chung, Daejeon (KR); Song-Taek Oh, Daejeon (KR); Sanguck Lee, Daejeon (KR); Jong Chan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/397,714

(22) Filed: Feb. 16, 2012

(65) Prior Publication Data
US 2013/0022872 A1 Jan. 24, 2013

Related U.S. Application Data

(63) Continuation of application No. PCT/KR2011/000104, filed on Jan. 7, 2011.

(30) Foreign Application Priority Data

Jan. 7, 2010 (KR) .................. 10-2010-0001373

(51) Int. Cl.
*H01M 4/00* (2006.01)
*H01M 4/505* (2010.01)
(Continued)

(52) U.S. Cl.
CPC ........... *H01M 4/505* (2013.01); *H01M 4/366* (2013.01); *H01M 4/625* (2013.01); *H01M 10/052* (2013.01)

(58) Field of Classification Search
CPC ...... H01M 4/505; H01M 4/525; H01M 4/625; H01M 4/131; H01M 4/1391; H01M 4/366; H01M 10/052
(Continued)

(56) References Cited

U.S. PATENT DOCUMENTS 5,674,645 A 10/1997 Amatucci et al.
5,939,043 A * 8/1999 Yahagi .......................... 423/599
(Continued)

FOREIGN PATENT DOCUMENTS

CN 1229528 A 9/1999
CN 1729586 A 2/2006
(Continued)

OTHER PUBLICATIONS

David Linden, Handbook of Batteries, 2002, McGraw-Hill, 3rd Edition, Chapter 35, p. 1074, 1077, 1079-1080, 1087.*
(Continued)

*Primary Examiner* — Jimmy K Vo
(74) *Attorney, Agent, or Firm* — Birch, Stewart, Kolasch & Birch, LLP

(57) ABSTRACT

Disclosed herein is a cathode active material including a lithium manganese oxide, in which the lithium manganese oxide has a spinel structure with a predetermined constitutional composition represented by Formula 1 described in the detailed description, wherein a conductive material is applied to the surface of lithium manganese oxide particles, so as to exhibit charge-discharge properties in the range of 2.5 to 3.5V as well as in the 4V region.

16 Claims, 2 Drawing Sheets

(51) Int. Cl.
*H01M 4/36* (2006.01)
*H01M 4/62* (2006.01)
*H01M 10/052* (2010.01)

(58) Field of Classification Search
USPC .... 429/220, 223, 231.95, 229, 231.5, 231.6, 429/221, 224
See application file for complete search history.

(56) References Cited

U.S. PATENT DOCUMENTS

| | | | |
|---|---|---|---|
| 7,763,387 B2 | 7/2010 | Yamamoto et al. | |
| 8,034,475 B2 | 10/2011 | Yamamoto et al. | |
| 2003/0049529 A1* | 3/2003 | Cho | H01M 4/386 429/217 |
| 2003/0186128 A1* | 10/2003 | Singh | C01G 45/1242 429/231.1 |
| 2005/0285080 A1* | 12/2005 | Suzuki et al. | 252/182.1 |
| 2007/0292760 A1* | 12/2007 | Patoux et al. | 429/223 |
| 2009/0170003 A1* | 7/2009 | Chen et al. | 429/231.5 |
| 2009/0305132 A1 | 12/2009 | Gauthier et al. | |

FOREIGN PATENT DOCUMENTS

| | | |
|---|---|---|
| CN | 101038965 A | 9/2007 |
| CN | 101542787 A | 9/2009 |
| KR | 10-2009-0102138 A | 9/2009 |
| KR | 1020090102138 * | 9/2009 |
| WO | WO 2009/120019 A1 | 10/2009 |

OTHER PUBLICATIONS

Park et al., "Synthesis and Characterization of a New Spinel, Li1.02Al0.25Mn1.75O3.97S0.03, Operating at Potentials Between 4.3 and 2.4V," Journal of the Electrochemical Society, vol. 147, No. 6, 2000, pp. 2116-2121.

Chinese Office Action issued in Chinese Patent Appitcation No. 201180005666.0 dated May 25, 2015.

Park et al., "Synthesis and Characterization of a New Spinel, Li1.02Al0.25Mn1.75O3.97S0.03, Operating at Potentials Between 4,3 and 2.4 V", Journal of the Electrochemical Society, vol. 147, No. 6 (2000) pp. 2116-2121.

Marcinek et al., "Microwave Plasma Chemical Vapor Deposition of Carbon Coatings on LiNi1/3Co1/3Mn1/3O2 for Li-Ion Battery Composite Cathodes", Journal of Electrochemical Society, vol. 156, No. 1 (2009) pp. A48-A51.

Jang et al., "Dissolution of Spinel Oxides and Capacity Losses in 4 V Li/LixMn2O4 Cells", J. Electrochem. Soc., vol. 143, No. 7 (1996) pp. 2204-2211.

Kang et al., "Effect of Ball-Milling on 3-V Capacity of Lithium-Manganese Oxospinel Cathodes", Chem. Mater., vol. 13 (2001) pp. 1758-1764.

Kang et al., "Structural and Electrochemical Study of Li-Ai-Mn-O-F Spinel Material for Lithium Secondary Batteries", Journal of Power Sources, vol. 146 (2005) pp. 237-240.

Sun et al., "Overcoming Jahn-Teller Distortion of Oxysulfide Spinel Materials for Lithium Secondary Batteries", Journal of Materials Chemistry, vol. 9 (1999) pp. 3147-3150.

* cited by examiner

CATHODE ACTIVE MATERIAL COMPRISING LITHIUM MANGANESE OXIDE CAPABLE OF PROVIDING EXCELLENT CHARGE-DISCHARGE CHARACTERISTICS AT 3V REGION AS WELL AS 4V REGION

CROSS REFERENCE TO RELATED APPLICATIONS

This application is a Continuation of PCT International Application No. PCT/KR2011/000104 filed on Jan. 7, 2011, which claims priority under 35 U.S.C. § 119(a) to Patent Application No. 10-2010-0001373 filed in the Republic of Korea on Jan. 7, 2010, all of which are hereby expressly incorporated by reference into the present application.

TECHNICAL FIELD

The present invention relates to a cathode active material including lithium manganese oxide to exhibit charge-discharge properties in high and low voltage regions, in which the cathode active oxide has a spinel structure based on a predetermined constitutional composition, and which includes a conductive material applied to a surface of lithium manganese oxide particles, so as to exhibit excellent charge-discharge properties in the range of 2.5 to 3.5 V as well as in the 4V region.

BACKGROUND ART

Technological development and increased demand for mobile equipment have led to a rapid increase in the demand for secondary batteries. Among these secondary batteries, lithium secondary batteries having high energy density and output voltage, long cycle life and low self-discharge ratio are commercially available and widely used.

Specifically, increased concern over environmental issues has brought about a great deal of research associated with electric vehicles (EV) and hybrid electric vehicles (HEV) as substitutes for vehicles using fossil fuels, such as gasoline vehicles and diesel vehicles, which are a major cause of air pollution. Although nickel metal hydride-based secondary batteries have mostly been used as a power source of such EV and/or HEV, a great deal of studies into use of lithium secondary batteries having high energy density and high discharge voltage is now extensively implemented and some of these are commercially available.

In conventional lithium secondary batteries, a carbon material is usually used as an anode active material and use of lithium metal, sulfur compounds and the like is also considered. Meanwhile, lithium cobalt oxide ($LiCoO_2$) is most commonly used as a cathode active material and, in addition, other lithium transition metal oxides including, e.g., lithium manganese oxides such as $LiMnO_2$ having a layered structure, $LiMn_2O_4$ having a spinel structure, etc., lithium nickel oxides such as $LiNiO_2$, are also used.

Among the foregoing cathode active materials, $LiCoO_2$ having excellent cycle life properties and charge-discharge efficiency is the most commonly used material. However, the above materials entail problems such as low structural stability and high costs for cobalt used as a raw material due to limited availability of cobalt resources, in turn reducing price competitiveness. Accordingly, there are restrictions on use of cobalt in large quantities in EV applications.

Meanwhile, although $LiNiO_2$ based cathode active materials are relatively cheap while embodying cell properties such as high discharge capacity, they exhibit rapid phase transition in a crystal structure depending upon capacity variation accompanied by charge-discharge cycle and, when exposed to air and/or moisture, encounter sharp reduction in safety.

Lithium manganese oxides such as $LiMnO_2$, $LiMn_2O_4$, etc. have merits of excellent thermal safety and low price but entail disadvantages such as low capacity, poor cycle life properties, poor properties at high temperature, etc.

Among these, spinel $LiMn_2O_4$ shows relatively uniform potential in the 4V region (3.7 to 4.3V) and the 3V region (2.7 to 3.1V). However, it is known that cycle life properties and storage properties of the above oxide are significantly deteriorated in the 3V region, thus causing difficulty in use thereof. The cause of this fact is that the above oxide is present in a single cubic phase in the 4V region due to phase transition based on Jahn-Teller distortion, while being converted into two-phase comprising the cubic phase and the tetragonal phase in the 3V region, and/or is dissolved into a manganese electrolyte.

For such reasons, when a spinel lithium manganese oxide is utilized in the 3V region, real capacity of the oxide is generally lower than a theoretical capacity of the same and C-rate properties are relatively low.

Therefore, it is known that utilization of spinel lithium manganese oxides in the 3V region becomes very difficult and few studies have focused thereupon, as compared to research and development into utilization of the same in the 4V region. Some studies have reported that cycle life properties may be improved by formation of a tetragonal phase or S-doping. However, such improvement is insignificant and/or exact reasons thereof have not been investigated.

Regarding utilization of lithium manganese oxides in the 3V region, Kang and Goodenough, et al. (Sun-Ho Kang, John B. Goodenough, et al., Chem. Mater. 2001, 13, 1758-1764) have proposed a technique for enhancing cycle life properties in the 3V region by forming nanograins and generating strain in the lithium manganese oxide by mixing a spinel lithium manganese oxide with carbon through milling. However, this method attains insignificant effects and does not explain reasonable grounds for improvement of cycle life properties.

The present inventors have found that conventional methods in the prior art including results of the foregoing studies may not embody desired charge-discharge properties in the 3V region.

DISCLOSURE

Technical Problem

Accordingly, the present invention has been made to solve the above and other technical problems that have yet to be resolved.

As a result of a variety of extensive and intensive studies and experiments to solve the problems as described above, the inventors of the present invention have investigated main causes of relatively low electro-chemical performance in the 3V region (2.5 to 3.5V) and found that, if a conductive material is applied to the surface of specific lithium manganese oxide particles, excellent charge-discharge properties may be attained in the 3V region as well as in the 4V region known in prior art, based on the foregoing reasonable grounds. The present invention was completed based on this discovery.

Technical Solution

Therefore, in an aspect of the present invention, there is provided a cathode active material including lithium manganese oxide having a spinel structure with the constitutional composition represented by Formula 1, wherein a conductive material is applied to the surface of lithium manganese oxide particles, so as to exhibit favorable charge-discharge properties in the range of 2.5V to 3.5V as well as in the 4V region.

$$Li_{1+y}M_zMn_{2-y-z}O_{4-x-a}Q_xR_a \qquad (1)$$

In the above Formula 1, $0 \leq x \leq 1$; $0 \leq y \leq 0.3$; $0 \leq z \leq 1$; M is at least one or more element selected from a group consisting of Al, Mg, Ni, Co, Fe, Cr, V, Ti, Cu, B, Ca, Zn, Zr, Nb, Mo, Sr, Sb, W, Ti and Bi; Q is at least one or more element selected from a group consisting of N, F, S and Cl; R denotes a vacancy formed due to oxygen escaping from a crystal lattice; and $0 \leq a \leq 2$.

A general spinel lithium manganese oxide is present in a single cubic phase in the 4V region (3.7 to 4.3V) and is converted into a tetragonal phase in the 3V region (2.5 to 3.5V) through phase transition by Jahn-Teller distortion effects because $Mn^{3+}$ ions exist in large quantities in the 3V region, in turn considerably deteriorating charge-discharge properties. For instance, if a secondary battery is fabricated under the same conditions, the secondary battery has real capacity in the 4V region substantially approaching a theoretical capacity (i.e., the theoretical capacity is about 130 mAh/g in both the 4V region and the 3V region). However, the real capacity in the 3V region of the secondary battery is typically 90 mAh/g, which is significantly lower than the theoretical capacity.

As such, a reasonable ground for considerable reduction in charge-discharge properties due to phase transition in the 3V region needs to be investigated.

In this regard, as a result of a variety of extensive and intensive studies and experiments, the present inventors have discovered that electrical conductivity of the tetragonal phase is about 25% that of the cubic phase through computational chemical methods. Moreover, it was surprisingly found that, if a conductive material is applied to the surface of spinel lithium manganese oxide particles in order to improve electrical conductivity, real capacity in the 3V region (2.5 to 3.5V) is increased to a theoretical capacity level and cycle life properties may be improved. Such findings are unexpected and innovative discoveries to maximize usefulness of spinel lithium manganese oxides.

As described above, it may be presumed that improvement in charge-discharge properties by application of conductive materials includes improvement in electric conductivity of a tetragonal phase obtained after phase transition and, in addition, improvement in charge-discharge properties in the 3V region on the basis of the following factors.

In particular, coating of a spinel lithium manganese oxide with a conductive material may inhibit negative reaction occurring at an interface between the lithium manganese oxide and an electrolyte. A spinel lithium manganese oxide generally has large quantities of $Mn^{3+}$ ions present in the 3V region. Such $Mn^{3+}$ ions undergo 'disproportionation' ($2Mn^{3+} \rightarrow Mn^{4+}+Mn^{2+}$) and the generated $Mn^{2+}$ ions are dissolved in the electrolyte, in turn deteriorating cycle life properties and storage characteristics. In this regard, coating of a spinel lithium manganese oxide with a conductive material according to the present invention may reduce a reaction area at the interface between the lithium manganese oxide and the electrolyte.

Meanwhile, in the 3V region, electrochemical grinding (e.g., amorphorization) generally occurs by phase transition based on Jahn-Teller distortion, causing decrease in charge-discharge properties. However, coating of a spinel lithium manganese oxide with a conductive material according to the present invention may overcome the foregoing problems.

Therefore, the present invention may embody different effects and/or activities by coating of a spinel lithium manganese oxide with a conductive material, to thereby attain a desired level of charge-discharge properties in the 3V region.

According to the present invention, a spinel lithium manganese oxide may include a cubic phase or a tetragonal phase, or both of these. That is, the inventive spinel lithium manganese oxide may be obtained by applying a conductive material to the surface of lithium manganese oxide particles in a cubic phase, applying a conductive material to the surface of lithium manganese oxide particles in a tetragonal phase or, otherwise, applying a conductive material to the surface of lithium manganese oxide particles in both cubic and tetragonal phases.

The conductive material used herein is not particularly limited so long as it has excellent electrical conductivity and does not cause negative reaction under internal environments, and is more preferably selected from carbon based materials having high conductivity. Preferred examples of the high conductivity carbon materials may include carbon based materials having a graphene or graphite crystal structure. Optionally, conductive polymers having high conductivity may be used.

If an amount of the applied conductive material is too small, desired effects may not be expected. On the contrary, when the foregoing amount is too large, an amount of an active material may be relatively decreased, in turn reducing (discharge) capacity. Accordingly, a content of the conductive material may range from 1 to 40 wt. %, preferably, 3 to 30 wt. %, relative to a total weight of the conductive material and the lithium manganese oxide.

The conductive material may be applied to the surface of lithium manganese oxide particles by a variety of coating methods, for instance, by a dry process comprising high energy milling or mixing both the conductive material and the lithium manganese oxide.

Alternatively, a wet process that disperses a lithium manganese oxide in a solvent, applies a precursor of the conductive material to the surface of the dispersion, and dries the coated material and recovers the used solvent, may also be used.

The cathode active material used in the present invention may further include other active materials in addition to the foregoing spinel lithium manganese oxide and, in this regard, an amount of the spinel lithium manganese oxide may range from 30 to 100%, preferably, 50 to 100%, relative to a total weight of the cathode active material. Here, other active materials described above may be selected from active materials in the prior art and, for example, include; lithium-cobalt oxides, lithium-nickel oxides, lithium manganese oxides, lithium cobalt-manganese oxides, lithium nickel-manganese oxides, lithium cobalt-nickel oxides, lithium cobalt-manganese-nickel oxides, doped oxides obtained by doping other element(s) or substituting metal moieties of the foregoing oxides with other element(s), or the like.

The present invention also provides a lithium manganese oxide in a spinel structure, in which nanograins are not contained in particles of the oxide and which exhibits charge-discharge properties in the range of 2.5 to 3.5V.

The inventive lithium manganese oxide is novel and may successfully embody excellent charge-discharge properties in 3V region, thereby fulfilling a long-cherished demand of prior art.

As described above, some conventional techniques have proposed nanograin formation and strain occurrence to enhance cycle life properties in the 3V region but only adopted high energy milling to improve cycle life properties in the 3V region and exhibited extremely limited effects. Further, an exact reason for improvement in performance (that is, cycle life properties) was not investigated.

On the other hand, the present invention may attain desired charge-discharge properties in the 3V region without use of nanograins formed through high energy milling. That is, even if high energy milling is not involved, nano-scale primary particles may be obtained by co-precipitation, hydrothermal synthesis, etc. and the surface of such obtained particles may be effectively coated with a conductive material, thereby enhancing performance of the particles in the 3V region.

The present invention also provides a cathode mix including the foregoing cathode active material.

The cathode mix may optionally include a conductive material, a binder, a filler, etc., in addition to the cathode active material.

The conductive material may be added in an amount of 1 to 50 wt. % relative to a total weight of a mixture containing the cathode active material. Such conductive material is not particularly restricted so long as it has conductive properties without causing chemical modification of a battery. The conductive material may include, for example: graphite such as natural graphite or artificial graphite; carbon black such as carbon black, acetylene black, ketchen black, channel black, furnace black, lamp black, summer black, etc.; conductive fibers such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

The binder assists in combination of an active material with a conductive material and bonding to a current collector and is normally added in an amount of 1 to 50 wt. %, relative to a total weight of a mixture containing the cathode active material. Examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorinated rubber, various copolymers, and so forth.

The filler is a supplementary ingredient to inhibit electrode expansion, is optionally used and is not particularly restricted so long as it comprises fibrous materials without causing chemical modification of a battery. The filler may include, for example, olefin polymers such as polyethylene, polypropylene, etc., fibrous materials such as glass fiber or carbon fiber, and so forth.

The present invention also provides a cathode for a secondary battery, which comprises the foregoing cathode mix applied to the current collector.

The cathode for a secondary battery may be fabricated by, for example, mixing the cathode mix in a solvent such as NMP to prepare a slurry, applying the slurry to an anode collector and drying and rolling the coated current collector.

The cathode current collector described above is generally fabricated to have a thickness in the range of 3 to 500 µm. Such cathode current collector is not particularly restricted so long as it has high conductivity without causing chemical modification of a battery. For example, the cathode current collector may be fabricated using stainless steel, aluminum, nickel, titanium, calcined carbon, or stainless steel or aluminum surface-treated with carbon, nickel, titanium or silver, and so forth. The current collector may be processed to have fine irregularities on the surface thereof, so as to enhance adhesion to an electrode active material. In addition, the current collector may have various forms including films, sheets, foils, nets, porous structures, foams, non-woven fabrics, etc.

The present invention also provides a lithium secondary battery including the cathode described above, an anode, a separator and a non-aqueous electrolyte containing lithium salts. The inventive lithium secondary battery may be fabricated by coating $Li_{(1+x)}Mn_2O_4$ with a conductive material, to thereby exhibit excellent capacity and cycle life properties even in the range of 2.5V to 3.5V.

The anode used herein is fabricated by, for example, applying an anode mix containing an anode active material to an anode current collector then drying the coated collector. In this case, the anode mix may optionally include the foregoing components.

The anode current collector is generally fabricated to have a thickness in the range of 3 to 500 µm. Such anode current collector is not particularly restricted so long as it has favorable conductivity without causing chemical modification to a battery. For example, the anode current collector may be fabricated using copper, stainless steel, aluminum, nickel, titanium, calcined carbon, copper or stainless steel surface-treated with carbon, nickel, titanium or silver, aluminum-cadmium alloy, and so forth. Similar to the cathode current collector, the anode current collector may be processed to have fine irregularities on the surface thereof, so as to enhance adhesion to an electrode active material. In addition, the anode current collector may have various forms including films, sheets, foils, nets, porous structures, foams, non-woven fabrics, etc.

The separator used herein is interposed between the cathode and the anode and may be formed using a thin insulation film having a high ion permeability and excellent mechanical strength. The separator typically has a pore diameter of 0.01 to 10 µm and a thickness of 5 to 300 µm. As the separator, a sheet or non-woven fabric made of olefin polymer such as polypropylene and/or glass fibers or polyethylene, which have chemical resistance and hydrophobicity, are used. When a solid electrolyte comprising polymer is employed as the electrolyte, the solid electrolyte may also serve as the separator.

The non-aqueous electrolyte containing lithium salt used herein comprises a lithium salt as well as a non-aqueous electrolyte. The non-aqueous electrolyte may be a non-aqueous organic solvent, organic solid electrolyte, inorganic solid electrolyte, or the like.

The non-aqueous organic solvent may be an aprotic organic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivative; sulfolane; methyl sulfolane; 1,3-dimethyl-2-imidazolidinone;

propylene carbonate derivatives; tetrahydrofuran derivatives; ether; methyl propionate; ethyl propionate, or the like.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and/or sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$NiOH$, $Li_3PO_4$—$Li_2S$—$SiS_2$, etc.

The lithium salt used herein is a material readily dissolved in the non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic lithium, lithium 4-phenyl borate, imides, or the like.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the non-aqueous electrolyte. If necessary, in order to impart non-flammability, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The secondary battery fabricated according to the present invention may be employed in a battery cell for a small device and, in addition, preferably used as a unit cell for medium and/or large-scale battery modules having a number of battery cells.

Preferred examples of medium and large-scale devices may include; electric vehicles, hybrid electric vehicles, plug-in hybrid electric vehicles, power storage systems, and so forth, without being particularly limited thereto.

BRIEF DESCRIPTION OF THE DRAWINGS

The above and other objects, features and other advantages of the present invention will be more clearly understood from the following detailed description taken in conjunction with the accompanying drawings, in which.

BEST MODE

The present invention will be described in more detail with reference to the following Examples. These examples are provided only to illustrate the present invention and should not be construed as limiting the scope and spirit of the present invention.

Example 1

A cathode mix including 90 wt. % of a spinel lithium manganese oxide, 3 wt. % of graphite, 3 wt. % of Danka black and 4 wt. % of PVDF was prepared. More particularly, after milling the spinel lithium manganese oxide and the graphite in the foregoing content ratios, the prepared graphite-coated spinel lithium manganese oxide was mixed with the Danka black and PVDF in the foregoing content ratios, thus obtaining a cathode mix.

Comparative Example 1

Mixing 90 wt. % of a spinel lithium manganese oxide, 6 wt. % of Danka black and 4 wt. % of PVDF, a cathode mix was prepared without an additional graphite coating process.

Experimental Example 1

By adding each cathode mix prepared in Example 1 and Comparative Example 1 to NMP, a slurry was prepared and then applied to a cathode current collector. The cathode current collector was rolled and dried to form a cathode for a secondary battery. By interposing a porous polyethylene separator between the formed cathode and a lithium metal based anode and introducing a lithium electrolyte therebetween, a coin type lithium secondary battery was fabricated.

The fabricated battery was subjected to repeated charge/discharge at 0.1 C to determine variation in capacities depending upon the number of cycles.

Figure 1:
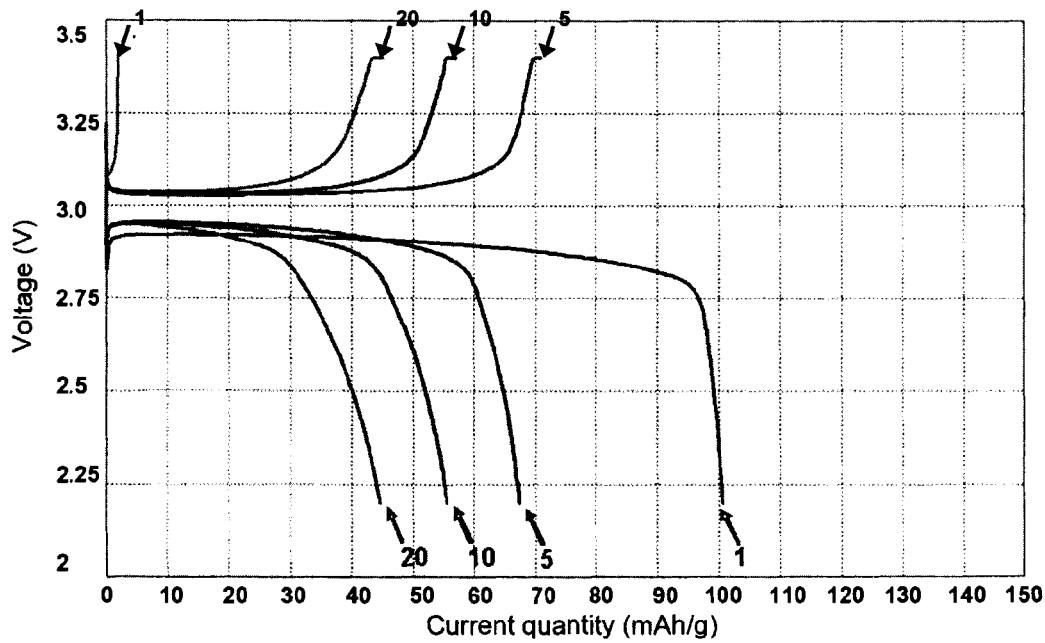
FIG. 1 is graphs illustrating test results depending upon cycle increase in the 3V region, in a charge-discharge test at 0.1 C for a lithium secondary battery using a cathode mix prepared in Comparative Example 1.

FIG. 1 shows variation in capacities of the fabricated secondary battery according to Comparative Example 1 to increase in cycles in the 3V region (2.5 to 3.5V).

Referring to FIG. 1, charging does not occur in the 3V region during first charging, while lithium ions are discharged from a lithium anode in the 3V region during first discharging. Thereafter, the lithium ions derived from the lithium anode are again charged in the same lithium anode during charging in the 3V region. The secondary battery fabricated using the cathode mix according to Comparative Example 1 exhibited an initial capacity of about 100 mAh/g, large decrease in capacity, and continuous decrease in capacity during repeated cycles. As described above, the foregoing results have been induced from phase transition based on Jahn-Teller distortion and $Mn^{2+}$ ion dissolution.

Figure 2:
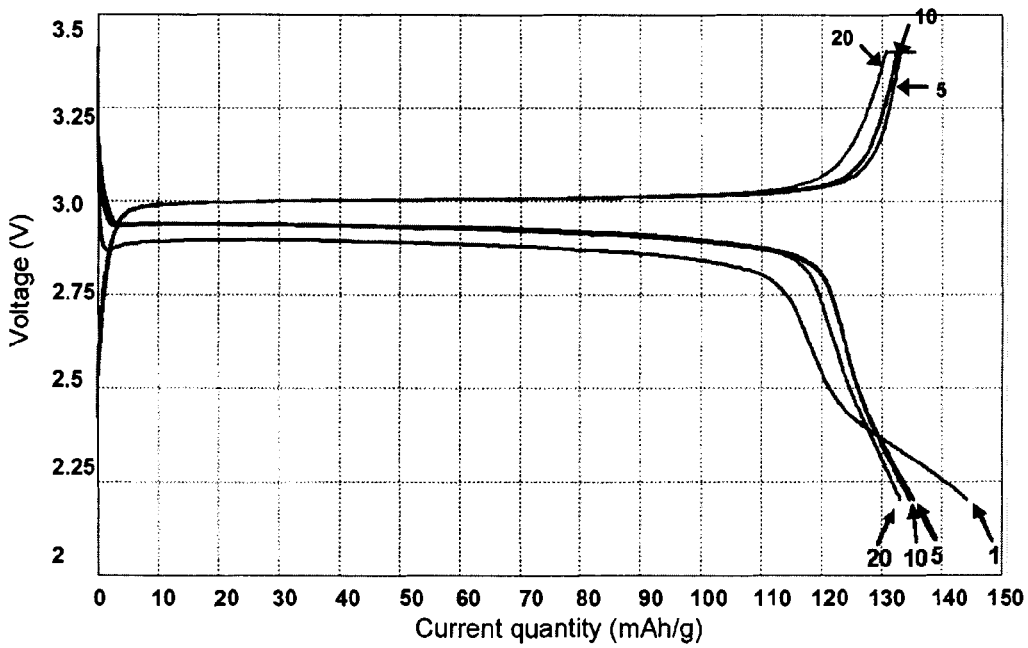
FIG. 2 is graphs illustrating test results depending upon cycle increase in the 3V region, in a charge-discharge test at 0.1 C for a lithium secondary battery using a cathode mix prepared in Example 1.

FIG. 2 shows variation in capacities of the fabricated secondary battery according to Example 1, to increase in cycles in the 3V region (2.5 to 3.5V).

Similar to FIG. 1, a charge graph in the 3V region in FIG. 2 is not observed because lithium ions to be charged in an anode are not present during first charging. The secondary battery fabricated using the cathode mix according to Example 1 exhibited an initial capacity of about 144 mAh/g, which is relatively higher than that of the secondary battery fabricated using the cathode mix according to Comparative Example 1, and no substantial decrease in capacity even after repeated cycling.

Figure 3:
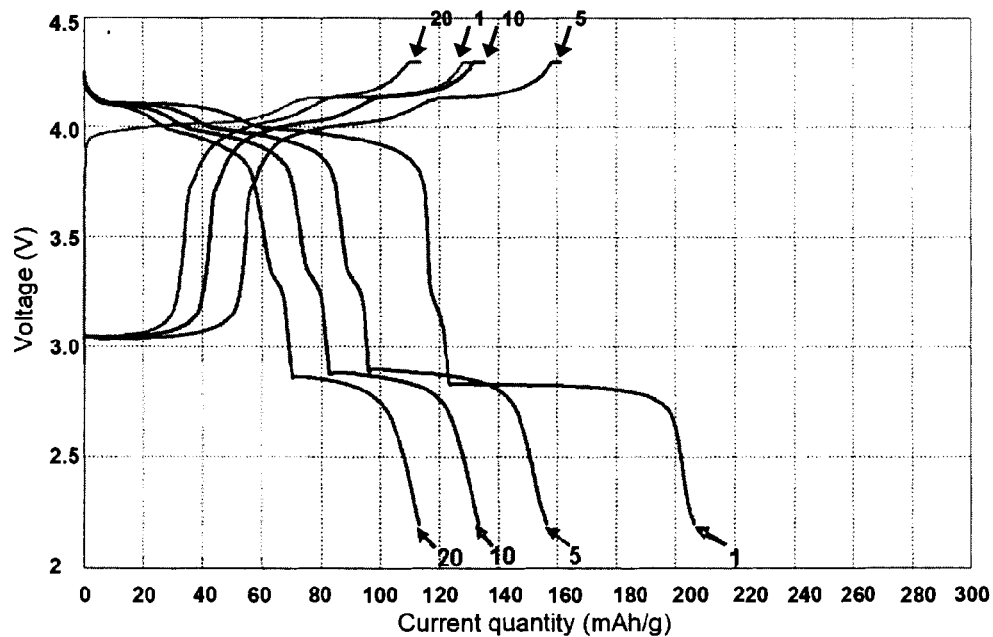
FIG. 3 is graphs illustrating test results depending upon cycle increase in the 3 to 4V region, in a charge-discharge test at 0.1 C for a lithium secondary battery using a cathode mix prepared in Comparative Example 1.

FIG. 3 shows variation in capacities of the fabricated secondary battery according to Comparative Example 1, to increase in cycles in the 3 to 4V region.

Referring to FIG. 3, it can be seen that charging does not occur in the 3V region, instead, occurs only in the 4V region during first charging. Thereafter, a uniform potential section is observed during charging in the 3V region. Also, similar to FIG. 1, decrease in capacity is considerably increased during repeated cycles while a length of the uniform potential section is reduced.

Figure 4:
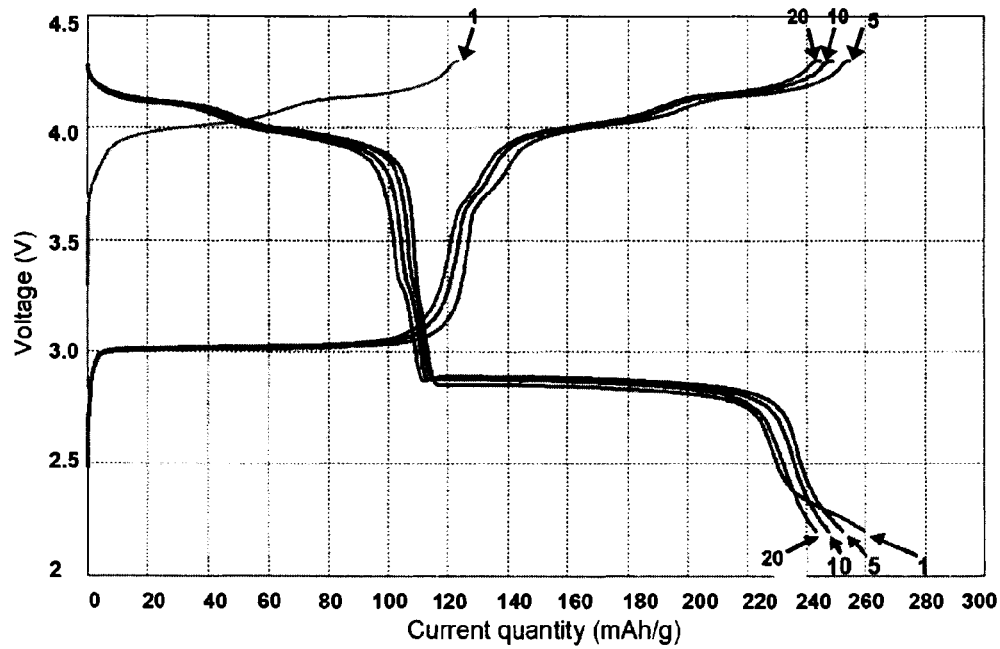
FIG. 4 is graphs illustrating test results depending upon cycle increase in the 3 to 4V region, in a charge-discharge test at 0.1 C for a lithium secondary battery using a cathode mix prepared in Example 1.

FIG. 4 shows variation in capacities of the fabricated secondary battery according to Example 1, to increase in cycles in the 3 to 4V region.

Similar to FIG. 3, it can be seen from FIG. 4 that charging does not occur in the 3V region, instead, occurs only in the 4V region during first charging. Thereafter, a uniform potential section is observed during charging in the 3V region. Also, similar to FIG. 2, the secondary battery according to Example 1 exhibits an initial capacity greater than that according to Comparative Example 1 and very little (insignificant) decrease in capacity during repeated cycles. Moreover, a length of a uniform potential section is substantially unchanged, thereby demonstrating superior charge-discharge performance.

Experimental Example 2

After dispersing 1 g of the graphite-coated spinel lithium manganese oxide prepared in Example 1 in 5 ml of an electrolyte (EC:EMC=1:2 (v/v %), 1M LiPF), a container including the dispersion was sealed and stored at 25° C. After 1 week, the dispersion became colorless and transparent. On the other hand, when 1 g of the spinel lithium manganese oxide prepared in Comparative Example 1 without graphite coating was dispersed in the same electrolyte and stored for 1 week under the same conditions as described above, it was observed that the dispersion was became violet and translucent. From these results, it can be confirmed that negative reaction between the graphite-coated spinel lithium manganese oxide prepared in Example 1 and the electrolyte is considerably inhibited owing to coating effects.

Example 2

A cathode mix including 62 wt. % of a spinel lithium manganese oxide, 26 wt. % of graphite, 2 wt. % of Danka black and 10 wt. % of PVDF was prepared. More particularly, after milling the spinel lithium manganese oxide and the graphite in the foregoing content ratios, the prepared graphite-coated spinel lithium manganese oxide was mixed with the Danka black and PVDF in the foregoing content ratios, thus obtaining a cathode mix.

Example 3

A cathode mix including 53 wt. % of a spinel lithium manganese oxide, 34 wt. % of graphite, 2 wt. % of Danka black and 11 wt. % of PVDF was prepared. More particularly, after milling the spinel lithium manganese oxide and the graphite in the foregoing content ratios, the prepared graphite-coated spinel lithium manganese oxide was mixed with the Danka black and PVDF in the foregoing content ratios, thus obtaining a cathode mix.

Comparative Example 2

A cathode mix including 42 wt. % of a spinel lithium manganese oxide, 42 wt. % of graphite, 2 wt. % of Danka black and 14 wt. % of PVDF was prepared. More particularly, after milling the spinel lithium manganese oxide and the graphite in the foregoing content ratios, the prepared graphite-coated spinel lithium manganese oxide was mixed with the Danka black and PVDF in the foregoing content ratios, thus obtaining a cathode mix. It can be seen that the present cathode mix has considerably decreased adhesion to an aluminum foil, as compared to the cathode mixes prepared in Examples.

Comparative Example 3

A cathode mix including 89 wt. % of a spinel lithium manganese oxide, 1 wt. % of graphite, 5 wt. % of Danka black and 5 wt. % of PVDF was prepared. More particularly, after milling the spinel lithium manganese oxide and the graphite in the foregoing content ratios, the prepared graphite-coated spinel lithium manganese oxide was mixed with the Danka black and PVDF in the foregoing content ratios, thus obtaining a cathode mix.

Experimental Example 3

According to the procedures described in Experimental Example 1, secondary batteries were respectively fabricated using the cathode mixes prepared in Examples 2 and 3 as well as Comparative Examples 2 and 3, and then, charge-discharge performance thereof was assessed. Measured initial capacities and $20^{th}$ cycle capacities of the fabricated secondary batteries are shown in TABLE 1.

TABLE 1

| | Initial capacity (mAh/g) | | $20^{th}$ cycle capacity (mAh/g) | |
|---|---|---|---|---|
| | 3 V region | 3 to 4 V region | 3 V region | 3 to 4 V region |
| Example 2 | 133 | 251 | 129 | 240 |
| Example 3 | 126 | 253 | 121 | 245 |
| Comparative Example 2 | 105 | 210 | 54 | 137 |
| Comparative Example 3 | 101 | 205 | 51 | 94 |

As shown in TABLE 1, it can be seen that the initial capacity and $20^{th}$ cycle capacity of the secondary batteries fabricated using the cathode mixes prepared in Examples 2 and 3 are superior to those of the secondary batteries fabricated using the cathode mixes prepared in Comparative Examples 2 and 3.

The reason of adding different amounts of the binder in Examples and Comparative Examples is why adhesion of the cathode mix to a current collector is deteriorated as a content of graphite increases, thus causing difficulties in fabrication of electrodes.

The foregoing results of Comparative Example 2 are because adhesion to an aluminum foil is decreased as shown in the above TABLE 1 when a content of graphite is too high, in turn deteriorating cycle life properties. On the other hand, when the graphite content is increased, a content of the lithium manganese oxide is relatively decreased, resulting in reduction in energy density. Therefore, use of the cathode mixes prepared in Comparative Examples may entail economic disadvantages.

On the contrary, the foregoing results of Comparative Example 3 are because graphite is not sufficiently applied to the lithium manganese oxide since the graphite content is too low.

INDUSTRIAL APPLICABILITY

As apparent from the foregoing description, the present invention may improve characteristics of a spinel lithium manganese oxide, which originally has low capacity and cycle life properties, in the 3V region (2.5 to 3.5V) and, therefore, may enable production of a lithium manganese oxide-based cathode active material having excellent charge-discharge performance. In addition, a cathode mix, a cathode for a secondary battery, and a lithium secondary batter may be manufactured using the cathode active material described above.

Those skilled in the art will appreciate that various modifications and alterations may be possible, based on the foregoing description, without departing from the scope and spirit of the invention as defined in the appended claims.

The invention claimed is:

1. A cathode active material comprising:
cathode active material particles consisting of at least one lithium manganese oxide, in which the lithium manganese oxide has a spinel structure with specific constitutional composition represented by Formula 1, and a coating layer consisting of a conductive carbon-based material present on a whole external surface of the cathode active material particles, so as to exhibit charge-discharge properties in the range of 2.5 to 3.5V as well as 4V region:

$$Li_{1+y}M_zMn_{2-y-z}O_{4-x-a}Q_xR_a \quad (1)$$

wherein $0 \leq x \leq 1$; $0 \leq y \leq 0.3$; $0 < z \leq 1$; M is at least one or more element selected from a group consisting of Al, Mg, Ni, Co, Fe, Cr, V, Ti, Cu, B, Ca, Zn, Zr, Nb, Mo, Sr, Sb, W, Ti and Bi; Q is at least one or more element selected from a group consisting of N, F, S and Cl; R denotes a vacancy formed due to oxygen escaping from a crystal lattice; and $0 < a \leq 2$,
wherein the 4V region is in the range of 3.7 to 4.3V, and
wherein the content of the conductive material ranges from 30 to 40 wt. %, relative to a total weight of the conductive material and the lithium manganese oxide.

2. The cathode active material according to claim 1, wherein the lithium manganese oxide has at least one selected from a cubic phase and a tetragonal phase.

3. The cathode active material according to claim 2, wherein the conductive material is applied to the whole external surface of the lithium manganese oxide particles in a cubic phase.

4. The cathode active material according to claim 2, wherein the conductive material is applied to the whole external surface of the lithium manganese oxide particles in a tetragonal phase.

5. The cathode active material according to claim 1, wherein the carbon based material has a graphene or graphite crystal structure.

6. The cathode active material according to claim 1, wherein the conductive material is applied to the whole external surface of lithium manganese oxide particles by a dry process comprising high energy milling or mixing of the conductive material and the lithium manganese oxide.

7. The cathode active material according to claim 1, wherein the conductive material is applied to the whole external surface of lithium manganese oxide particles by a wet process comprising dispersing the lithium manganese oxide in a solvent, surface coating the dispersion with a precursor of the conductive material, drying and recovering the solvent.

8. A nano-scale lithium manganese oxide particle comprising:
a cathode active material particle consisting of at least one lithium manganese oxide with specific constitutional composition represented by Formula 1, said lithium manganese oxide having a spinel structure without nanograins in particles of the lithium manganese oxide, and a coating layer consisting of a conductive carbon-based material present on a whole external surface of the nano-scale lithium oxide particle, which exhibits charge-discharge properties in the range of 2.5 to 3.5V as well as 4V region:

$$Li_{1+y}M_zMn_{2-y-z}O_{4-x-a}Q_xR_a \quad (1)$$

wherein $0 \leq x \leq 1$; $0 \leq y \leq 0.3$; $0 < z \leq 1$; M is at least one or more element selected from a group consisting of Al, Mg, Ni, Co, Fe, Cr, V, Ti, Cu, B, Ca, Zn, Zr, Nb, Mo, Sr, Sb, W, Ti and Bi; Q is at least one or more element selected from a group consisting of N, F, S and Cl; R denotes a vacancy formed due to oxygen escaping from a crystal lattice; and $0 < a \leq 2$,
wherein the 4V region is in the range of 3.7 to 4.3 V, and
wherein the content of the conductive material ranges from 30 to 40 wt. %, relative to a total weight of the conductive material and the lithium manganese oxide.

9. A cathode mix comprising:
the cathode active material as set forth in claim 1;
a conductive agent; and
a binder.

10. A cathode for a secondary battery formed by applying the cathode mix according to claim 9 to a current collector.

11. A lithium secondary battery comprising:
the cathode for a secondary battery according to claim 10.

12. The lithium secondary battery according to claim 11, wherein the battery is suitable for use as a unit cell for a battery module which is a power source for a medium or large-scale device.

13. The lithium secondary battery according to claim 12 wherein the medium or large-scale device is an electric vehicle, a hybrid electric vehicle, a plug-in hybrid electric vehicle or a power storage system.

14. A cathode mix comprising:
the cathode active material as set forth in claim 8;
a conductive agent; and
a binder.

15. A cathode for a secondary battery formed by applying the cathode mix according to claim 14 to a current collector.

16. A lithium secondary battery comprising:
the cathode for a secondary battery according to claim 15.

* * * * *